O. BRISBOIS.
VALVE.
APPLICATION FILED JUNE 11, 1914.
1,140,332.
Patented May 18, 1915.
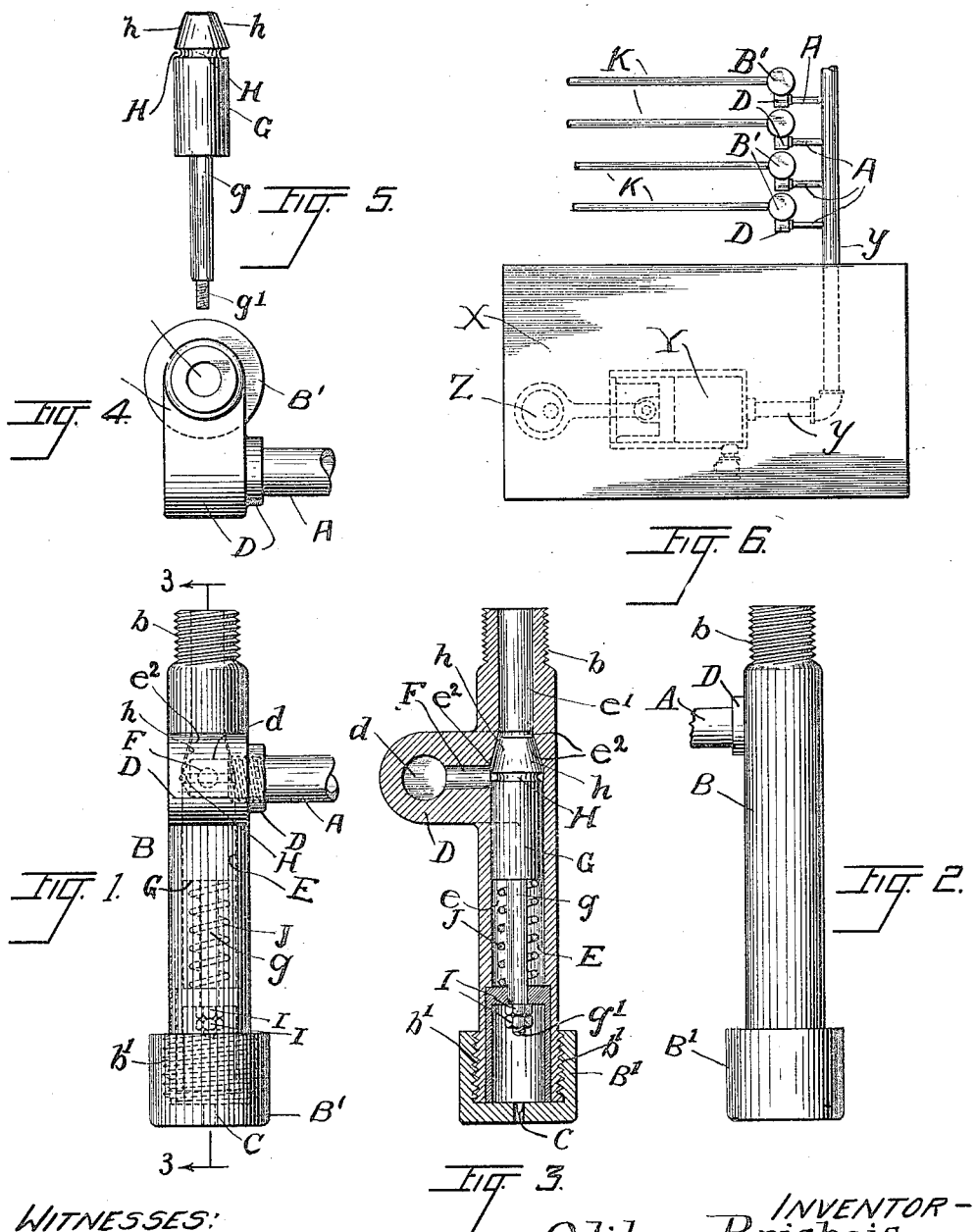
WITNESSES:
INVENTOR—
Odilon Brisbois,
BY
Charles Turner Brown,
ATTORNEY.

UNITED STATES PATENT OFFICE.

ODILON BRISBOIS, OF CHICAGO, ILLINOIS, ASSIGNOR OF FIFTY-ONE ONE-HUNDREDTHS TO JOHN H. WARE, OF CHICAGO, ILLINOIS.

VALVE.

1,140,332.  Specification of Letters Patent.  Patented May 18, 1915.

Application filed June 11, 1914. Serial No. 844,429.

*To all whom it may concern:*

Be it known that I, ODILON BRISBOIS, a citizen of the United States, and a resident of Chicago, in the county of Cook and State of Illinois, have invented certain new and useful Improvements in Valves, of which the following is a specification.

This invention relates to valves designed to control the flow of fluids in pipes, conduits and the like.

The objects of the invention are to obtain a valve which will at all times permit a measured flow of fluid therethrough, and which will, when an obstruction to said flow is encountered on the discharge side of said valve, automatically open, to remove substantially all the resistance offered by the valve body of the device to the flow of fluid through the valve, so that all the pressure which is being applied to the fluid will be transmitted through the device to remove said obstruction; to obtain a valve which will permit the continuous flow of fluid therethrough, and which, when because of said flow a determined pressure has been attained on the discharge side of the valve, will automatically open to permit a larger flow, or an increased flow in a given time, of said fluid therethrough; and to obtain a valve whereby the measured and continuous flow of fluid therethrough may be adjustably determined.

Further objects are to obtain a valve which is simple in construction, positive in action, not liable to break or get out of order, consisting of few parts, and durable.

I have illustrated a device embodying this invention, and showing how it may be used, in the drawing accompanying and forming a part hereof, in which—

Figure 1 is a side elevation of the device; Fig. 2 a side elevation, at an angle of 180 degrees from the view in Fig. 1; Fig. 3 a vertical section on line 3—3 of Fig. 1, viewed in the direction indicated by the arrows; Fig. 4 a plan view; Fig. 5 a side elevation of a valve body and stem forming an element in the device; and Fig. 6 an elevation of a tank and connecting pipes, and a top plan view of a number of devices embodying this invention, with broken lines indicating a pump in said tank.

A reference character applied to designate a given part indicates said part throughout the several figures of the drawing wherever the same appears.

X, Fig. 6, is a tank, Y is a pump and Z is an eccentric adapted to be rotated and to impart a reciprocating movement to the piston of pump Y. $y$ is a pipe adapted to receive fluid discharged from pump Y and to conduct the same to branch pipes A.

B is the shell or casing of the device embodying this invention. Shell or casing B is provided with screw threads $b$ at one end, and screw threads $b^1$ at the other end thereof. $B^1$ is a cap provided with internal screw threads fitting screw threads $b^1$. C is an aperture in the end of cap $B^1$. D is a projecting lug on shell B, and is provided with passage way $d$ therein, adapted to receive the discharge end of pipe A. E is a passage way extending through the shell or casing B. Passage way E is of two diameters, as at $e$, $e^1$, Fig. 3, and with conical shaped part $e^2$, which connects said parts $e$, $e^1$. F is a passage way, (Fig. 3), communicating with passage ways $d$ and E.

G is a valve body and $g$ is the stem of said valve body. H is an annular groove around valve body G, and $h$ is a conical part to said valve body corresponding to and co-acting with the conical connecting part $e^2$ of passage way E. The end of stem $g$ is provided with screw threads $g^1$, and I, I, are set nuts fitting on said screw threads $g^1$.

In Fig. 3 the nuts I, I, are shown on stem $g$ adjusted to give the greatest determinable distance between the conical part $h$ of valve body G and conical part $e^2$ of passage way E, and the greatest continuous flow of fluid through the device.

J is a spring, yieldingly holding the valve body G in an advanced position, that is, with the conical part $h$ of the valve body in its nearest adjusted position to conical part $e^2$ of passage way E. K are pipes, (Fig. 6), which are respectively attached to the discharge end of shell or casing B, and in communication with part $e^1$ of passage way E.

The operation of the device is,—when fluid is forced by pump Y through the pipe $y$ and branch pipes A into passage way $d$, said fluid flows through said passage way and through passage way F to and around the valve body G in passage way E, and from said passage way H through the adjusted space between conical part $h$ of said valve body G and the conical part $e^2$ of passage way E, through part $e^1$ of said passage way E and into pipes K. In case an obstruction should occur in any one of the pipes K the flow of fluid through the valve which discharges into said obstructed pipe is not thereby diverted to any one or all of the remaining valves, nor is the flow of fluid through said remaining valves increased by the said obstructed flow in any one of said pipes K. On the contrary, the valve controlling the flow to any one of said pipes K is opened by a rise in the pressure in said pipe so soon as said rise is sufficient to force the valve body back into a retracted position against the yielding pressure of spring J, and to thereby increase the space between part $h$ of said valve body and part $e^2$ of said passage way E. Any increase of pressure in pipes K and part $e^2$ of said passage way is received on the end of the valve body G, and tends to force said valve body back into the position last above set forth. It occurs, therefore, that in case said pipes K discharge the fluid flowing therethrough in receptacles corresponding in number with the number of said pipes, should the pressure in any one of said receptacles be increased to a determined number of ounces or pounds to the square inch, because of said flow thereinto, a corresponding pressure would be attained in said pipe K and part $e^2$ of passage way E, and the valve controlling the flow into said pipe K, and said increase in said pressure would force the valve body G back, as before described, and the flow into said receptacle having said increased pressure would be greater than would be the flow through the remaining valves and into the remaining receptacles. The increased flow above described would continue until the pressure in said receptacle was equal to the pressure produced by the pump Y or the pressure from any other source of fluid supply.

It is to be understood that the several pipes K may be provided with means to attach the discharge ends thereof to any receptacle, to journal bearings, or to other places, spaces or things; but that said means of attachment form no part of this invention.

I claim:—

1. A shell provided with a passage way therein, and said passage way having a conical portion thereto, at the discharge end thereof, in combination with a valve longitudinally movable in said passage way and adapted to be retracted from said discharge end, said valve provided with a conical portion adapted to co-act with said conical portion of said passage way to restrict said passage way when in an advanced position, said valve provided with an annular groove adjacent to said conical portion, means to yieldingly hold said valve in an advanced position, and said shell provided with an additional passage way communicating with said annular groove when said valve is in an advanced position, and with said first named passage way when said valve is in a retracted position.

2. A shell provided with a passage way therein, and said passage way having a conical portion thereto, in combination with a valve longitudinally movable in said passage way, and provided with a conical end adapted to co-act with said conical portion of said passage way, and said valve provided with an annular groove adjacent to said conical end, a stem to said valve, a spring on said stem adapted to yieldingly hold said valve in an advanced position, means to adjustably determine the position of said conical end of the valve to the conical portion of the passage way when said valve is in said advanced position and said shell provided with an additional passage way communicating, at substantially right angles thereto, with said first named passage way, and with said annular groove.

3. A device comprising a shell provided with a passage way therein having a conical portion at the discharge end thereof, in combination with a valve provided with an annular groove and with a conical portion between said annular groove and the end thereof, said conical portion adapted to co-act with said conical portion of said passage way, and obtain a restricted passage way from said discharge end of said shell when said valve is in an advance position, and with said annular groove in communication with said restricted passage way, and said valve adapted to obtain a maximum discharge passage way from said discharge end when in a retracted position, means to yieldingly hold said valve in an advanced position, and said shell provided with an additional passage way communicating with said first named passage way and said annular groove when said valve is in an advanced position and with said maximum discharge passage way when said valve is in a retracted position.

Signed at Chicago, Illinois, this 30th day of November, 1914.

ODILON BRISBOIS.

In the presence of—
CHARLES TURNER BROWN,
CHARLES B. HEBRON.